(12) United States Patent
Stuart

(10) Patent No.: US 9,284,616 B2
(45) Date of Patent: Mar. 15, 2016

(54) UNIVERSAL BIOMASS REFINERY

(71) Applicant: Earnest Stuart, Lansing, MI (US)

(72) Inventor: Earnest Stuart, Lansing, MI (US)

(*) Notice: Subject to any disclaimer, the term of this patent is extended or adjusted under 35 U.S.C. 154(b) by 0 days.

(21) Appl. No.: 14/869,192

(22) Filed: Sep. 29, 2015

(65) Prior Publication Data

US 2016/0017061 A1  Jan. 21, 2016

Related U.S. Application Data

(63) Continuation of application No. 13/807,393, filed as application No. PCT/US2011/042584 on Jun. 30, 2011, now Pat. No. 9,169,524.

(60) Provisional application No. 61/398,635, filed on Jun. 30, 2010, provisional application No. 61/458,752, filed on Dec. 1, 2010, provisional application No. 61/461,569, filed on Jan. 20, 2011, provisional application No. 61/461,644, filed on Jan. 21, 2011, provisional application No. 61/517,082, filed on Apr. 13, 2011.

(51) Int. Cl.
*C13K 13/00* (2006.01)

(52) U.S. Cl.
CPC . *C13K 13/00* (2013.01); *Y02E 50/16* (2013.01)

(58) Field of Classification Search
None
See application file for complete search history.

(56) References Cited

U.S. PATENT DOCUMENTS

| 5,411,594 A * | 5/1995 | Brelsford ............... B01J 19/242 127/1 |
| 6,409,841 B1 | 6/2002 | Lombard |
| 2010/0012583 A1 | 1/2010 | Stuart |
| 2010/0313882 A1 | 12/2010 | Dottori et al. |

* cited by examiner

Primary Examiner — Melvin C Mayes
Assistant Examiner — Stefanie Cohen
(74) Attorney, Agent, or Firm — Kagan Binder, PLLC

(57) ABSTRACT

The invention is directed to a process for refining biomass to produce hemicellulose hydrolyzates, cellulose of sugars involving the perforate at least a portion of the cells of the prepared biomass prior to hydrolyzing the biomass, reclaiming the catalysts used in hydrolysis for further hydrolysis, and drying the hydrolysis using reclaimed heat from previous steps in the process.

15 Claims, 4 Drawing Sheets

UNIVERSAL BIOMASS REFINERY

RELATED APPLICATION

This application is a continuation application of U.S. Ser. No. 13/807,393, filed Dec. 28, 2012, now U.S. Pat. No. 9,169,524, which claims the benefit from International Application No. PCT/US2011/042584, filed on Jun. 30, 2011, which in turn claims priority under 35 U.S.C. §119(e) to U.S. Provisional Application Nos. 61/398,635, filed Jun. 30, 2010; 61/458,752, filed Dec. 1, 2010; 61/461,569, filed Jan. 20, 2011; 61/461,644, filed Jan. 21, 2011; and 61/517,082, filed Apr. 13, 2011, all of which are incorporated herein by reference in their entireties.

FIELD OF THE INVENTION

The present invention relates generally to fast and energy efficient methods of refining biomass.

BACKGROUND OF THE INVENTION

Improvements to refining biomass on a large commercial scale would provide numerous benefits. The market for products of biomass refinement is in the billions of dollars per annum. Protein is a dietary requirement, but is insufficiently met by many populations, including in the tropics, an area where biomass can best be grown. Further, replacing grain fed to cattle with digestible fibre will make more corn available for human consumption worldwide. The market for sugars which can be converted into biofuels, chemicals and plastics is in the tens, possibly hundreds of billions of dollars per annum. Refining of biomass into sugars therefore represents a useful application. Given how readily available biomass is, the creation of a large scale commercial biomass refining process could provide a significant energy source worldwide.

To date, a large scale commercial process does not exist that converts the ligno-cellulose components of biomass to sugars. Concentrated acid, high-temperature dilute acid combinations, steam, moderate temperature/neutral pH dry grinding, strong alkali, liquid anhydrous ammonia, high water ratios of lime, conically-shaped rotor-stator tools, laboratory sonicating devices, liquid stream, high-shear, and cavitating devices have been used to attempt to refine biomass commercially. However, none of these processes have been scaled up to refine biomass economically.

The methods available that make use of acid require that the hydrolysis either occurs at high temperatures or uses high concentrations of strong acids which are difficult to remove from the product. Both of these issues lead to high production costs.

There is a demand for a lower energy, thermal-chemical process capable of complete or selective biomass refining with high catalyst recovery which does not requiring enzymes for cellulose hydrolysis or one which enhances enzymatic hydrolysis of cellulose, and which can effectively hydrolyze biomass into dry sugar solids without major degradation of sugars.

SUMMARY OF THE INVENTION

The present invention provides a thermal-chemical process for the refinement of biomass into useful products.

The invention is directed to a process for refining prepared biomass to produce a slurry having hemicellulose hydrolyzates in solution comprising the following steps:

Extracting trace sugars and extractables from the prepared biomass in a catalyst solution by applying mechanical shear or cavitation to create a first slurry, the first slurry having a first solids portion comprising hemicellulose and cellulose and a first liquid portion which comprises extractables in solution, to perforate at least a portion of the cells of the prepared biomass;

Mechanically separating the first solids portion for the first liquid portion; and Hydrolyzing hemicellulose in the biomass by applying mechanical shear or cavitation to the biomass in solution with a catalyst to create a second slurry having a second solids portion comprising cellulose, and a second liquids portion comprising hemicellulose hydrolyzates in solution.

The process may further comprise the steps of:

Mechanically separating the second solids portion from the second liquid portion, and Hydrolyzing cellulose in the second solids portion in the presence of at least one strong acid to produce solution comprising sugar.

The process may also include the step of hydrolyzing the lignin in the first solids portion or the second solids portion prior to the step of hydrolyzing the cellulose. in a catalyst solution by applying mechanical shear or cavitation; and the step of mechanically separating the liquid portion of the hydrolyzed lignin from the first solids portion or the second solids portion.

The process may also comprise the step of drying the solution comprising sugar by Introducing the solution comprising sugar into an expansion chamber with means for heating the expansion chamber to a temperature above the boiling point of the solution comprising sugar, and conveying sugars and vapors out of the expansion chamber into a solids-vapor separation zone with vapors rising towards a heat exchanger, while sugars are further conveyed into a final sugar dryer wherein the vapors going through the heat exchanger exchange heat with the means for heating the expansion chamber to maintain the temperature of the expansion chamber above the boiling point of the incoming sugar solution.

DETAILED DESCRIPTION

Figure 1:
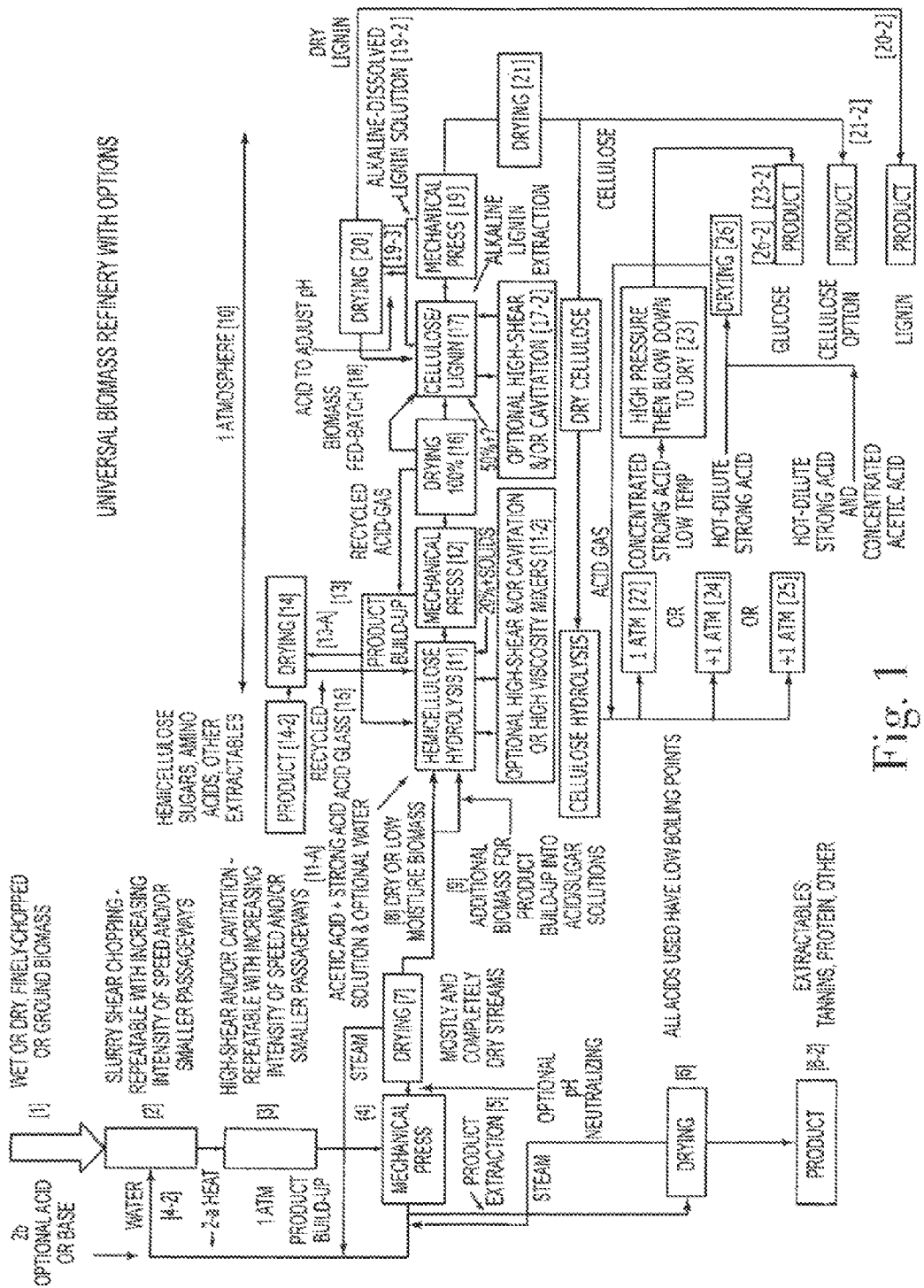
FIG. 1 depicts a process for refining biomass to protein extractables, tannins, hemicellulose sugars, lignin, cellulose and glucose, illustrating multiple process options for supplying dry feedstock to hemicellulose hydrolysis, and multiple cellulose hydrolysis options.
Figure 2:
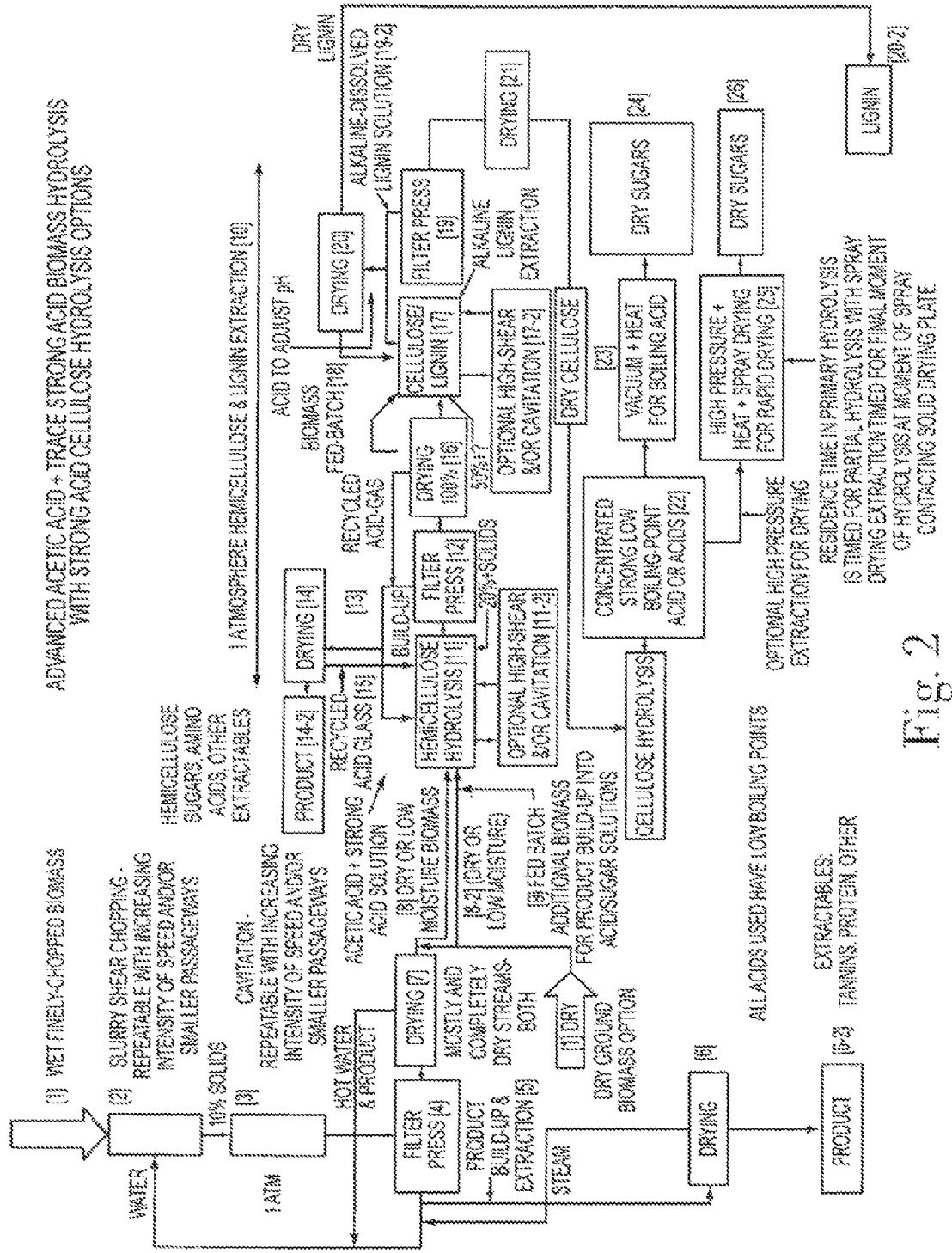
FIG. 2 depicts two pathways for strong acid hydrolysis of cellulose.

The invention is a process for refining biomass to produce refinable sugars from hemicellulose and cellulose fractions of biomass, and may also produce protein (or protein derivative polypeptides or amino acids), lignin, minerals, tannins, cellulose microfibers and cattle feed. The process may be used to process waste biomass into feedstock for chemicals and fuels. The described methods make use of recycled catalysts, including acetic acid derived from biomass, and are useful to produce economically viable products from biomass, including dry sugars, protein derivatives, cellulose microfibers, lignin, cattle feed, tannins and other products while providing new avenue for waste conversion.

The process may isolate lignin in one of three stages. The invention may also include producing dry cellulose microfibres. Alternately, a cellulose-lignin product can be produced.

The process may comprise many or all of the following steps, depending on the desired output products and recycling measures taken.

(1) Mechanically reducing biomass to smaller particle size and surface area;

(2) Adding a catalyst, heat, high shear and/or cavitation to hydrolyze a small portion of each biomass cell wall to enhance mechanical extraction of liquids and extractables;

(3) Mechanically separating the first slurry into biomass solids and a first liquid extraction containing hemicellulose derived hydrolyzates, protein and protein derivatives, tannins and other extractable products;

(4) Combining first liquid extraction with more new biomass;

(5) Repeating steps 2 and 3 to build up the concentration of extractable products in the first liquid extraction;

(6) Drying the mechanically separated residual biomass solids;

(7) Diverting a side stream of a first extractables liquid concentrate;

(8) Boiling the side stream of first liquid extractables, optionally using the heat exchanging dryer method described below;

(9) Recovering extractable products from first liquid extraction as dry product;

(10) Combining acid catalyst (which may be recycled from step (15)) with dry residual biomass microfiber solids (from step (6)) in a second slurry for hemicellulose hydrolysis;

(11) Adding further mild and/or strong acids catalyst to the second slurry, preferably while applying cavitation as needed, and maintaining temperature up to the boiling point of the catalyst;

(12) In the case where the system is initially building up a concentration of sugars in solution before reaching a steady state sugar concentration, mechanically separating the second slurry into un-dissolved cellulose-lignin solids and a liquid second slurry containing hemicellulose hydrolyzates and other extractables;

(13) Combining the second liquid extraction (from step (12)) with more residual biomass solids (from step (6)) and repeating steps (9)-(12) to further build up hemicellulose sugar hydrolyzates and extractables in the second liquid extraction;

(14) Separating the cellulose-lignin solids (which may be collected in step (12)) from any residual acid catalyst by boiling or evaporating the acid catalyst solution into vapors;

(15) Condensing acid catalyst vapors (from step (14)), recycling them for use in further hemicellulose hydrolysis of dry residual biomass solids in step (9), which may employ the heat exchanging dryer method described below;

(16) Boiling or evaporating a stream of the second liquid extraction to produce dry hemicellulose sugars and other extractables (which may be used in step (11)), to control second liquid portion viscosity, and to separate the acid catalysts from the dry hemicellulose sugars and extractables as vapors, which may employ the heat exchanging dryer method described below;

(17) Condensing acid catalyst vapors (from step (16)) and optionally recycling for their use in further hemicellulose hydrolysis of dry residual biomass solids in step (9) by way of condensing through heat exchanger into liquid, which may employ the heat exchanging dryer method described below;

(18) Creating a third slurry by combining a hot water-alkaline chemical solution with the mechanically separated and dried cellulose-lignin solids (from step (14)), causing a liquefaction of lignin and creating a third biomass solids comprised principally of cellulose;

(19) Mechanically separating the third slurry into cellulose solids and liquefied lignin and water-alkaline chemical solution;

(20) Optionally, the following steps can be employed to treat the separated cellulose solids for further use:
  a. Drying the cellulose solids of all or substantially all water to produce a cellulose product, or dried except for any water necessary for downstream hydrolysis if applicable;
  b. Washing cellulose microfibres with water to remove any residual liquefied lignin, mechanically separating and drying the cellulose or keeping the washed cellulose in solution or wetted form.

(21) Combining the liquefied lignin and water-alkaline chemical solution (from (19)) with more dried cellulose-lignin solids (from (14)) and repeating steps (18)-(19) to further build up liquefied lignin product and to recycle alkaline catalyst;

(22) Extracting liquefied lignin from the liquefied lignin and water-alkaline chemical solution by adding acid to precipitate the lignin;

(23) Mechanically filtering lignin solids from the water, optionally using sparging bubbles to float and concentrate lignin before filtration, then drying lignin by boiling the residual water-liquid from the lignin, then applying filtered water into step (18);

(24) Optionally creating a fourth slurry of cellulose and water for the hydrolysis of cellulose into glucose by combining cellulose (from (20)) with either:
  a. Concentrated strong acid and sufficient water to effect hydrolysis of cellulose, and keeping the slurry at one atmosphere pressure and at least one degree above freezing; or
  b. Water and dilute strong acid, and keeping the slurry at a temperature sufficient to hydrolyze the cellulose to glucose (170-250 degrees Celsius);
  c. Water and dilute strong acid and a concentrated mild acid, keeping the slurry at a temperature sufficient to hydrolyze the cellulose to glucose (170-250 degrees Celsius);

allowing for a residence time from 0.0001 second to 30 days,

(25) Adding additional cellulose (from (20)) to the cellulose slurry, one or more times to increase glucose concentration in the slurry; and, if required, more concentrated or dilute strong acid (as appropriate in either (24a) or (24b));

(26) Optionally applying high shear and/or cavitation during hydrolysis

(27) Flash boiling the slurry (from (23)) to yield glucose, and optionally drying the glucose by:
  a. Increasing pressure up to 20,000 psi, then instantly releasing pressure while adding heat sufficient to rapidly boil all remaining liquid catalyst during pressure release; and/or b. Optionally, applying a vacuum in combination with the pressure release and less heat (under 120 degrees Celsius), in order to boil acid catalysts at lower temperature, better preserving glucose from hydrolysis; and/or c. Using the heat exchanging dryer method described below.

More details on this method and its various options are described in the sections which follow.

Where it appears in the specification, "extractables" is intended to refer to tannins, protein, chlorophyll, and other chemical compounds that are soluble in water which are readily available for extraction in step 5 above. The extractables may also contain dissolved sugars.

The acetic acid may be produced as a product of hydrolysis, and is recovered and used as the catalyst in any stage which requires it.

As used in this specification, "sugars" include monosaccharides (e.g., glucose, fructose, galactose, arabinose), disaccharides (e.g., sucrose, lactose, maltose), and oligosaccharides and more rarely, trisaccharides, of each monomer sugars where appropriate.

Preparation of Biomass

As shown in FIG. 1, the particle size of wet or dry biomass is reduced to increase biomass feedstock density, manageability, and to create surface area to allow passage through even smaller portals within downstream process machines designed to further reduce particle size in order to maximize solids concentration and surface area for overall process efficiency with heat and chemicals.

Dry biomass (1a) is processed by at least one of the following: chopped, milled, ground and/or pulverized by mechanical methods to create small particles and high surface area prior to hydrolysis. Hog mills, hammermills, double-disk attrition mills, machete, or any dry grinding method known to those skilled in the art can be utilized to reduce particle size for further processing. Other methods including primitive chopping with machete, shredding, chopping or grinding systems powered by animals, water, wind or any cutting method device which reduces dry biomass particle size by slicing, crushing or chopping biomass into smaller particles are applied to prepare for further processing.

Wet biomass (1b) is chopped to small particles using a forage harvester such as those manufactured by John Deere, Case, Gleaner and others, and/or any method including, but not limited to primitive chopping with machete, shredding, chopping, blade cut or grinding systems or any cutting method device which reduces wet biomass particle size by slicing, crushing or chopping biomass into smaller particles than their native size, with methods powered by man, animals, water, wind, electricity, steam or any power source are applied to prepare biomass for further processing and to enhance downstream efficiency.

The term "prepared biomass" means biomass prepared in accordance with the foregoing paragraphs, and any biomass prepared by similar methods or systems known in the art.

Creating the First Slurry

Wet or dry biomass, having been reduced from native harvested or cut size, is further processed by adding sufficient water to create a first slurry with a low enough viscosity and whose biomass particles are small enough to be able to pump by centrifugal pumps.

Within the slurry created, particles are reduced to smaller particles in a sequence of low to high shear slurry devices, followed by cavitation (1a, 1b). The range of slurry passages within slurry devices is between 50 millimeters and 0.25 millimeters, the difference between regular shear turbulent flow and cavitation being rate of passage, hole size bored into rotors and/or stators, and related pressures; high pressure and vacuum in the case of cavitation. The temperature range for applying shear and/or cavitation to water or acid-water slurry is at least 1 degree Celsius above freezing point of slurry, up to but not at the boiling of the slurry at one atmosphere, or a higher temperature under pressure. Distinct from the slurry entering a cavitation device without bubbles, cavitation creates a localized boiling of the slurry water in producing first stage of cavitation: bubbles, which then collapse emitting a high speed shock wave; both stages causing extreme destruction of biomass particles from within and without the biomass surface, resulting in ever smaller and more disrupted particles.

In one embodiment, the temperature and boiling point of the slurry is increased by employing high pressure vessels and added heat, with temperatures being increased up to 170 degrees Celsius.

In one embodiment of the slurry, mild and strong acids with boiling points under 120 degrees Celsius can each be added in various ratio solution to biomass with a combined total up to 99.999%, or high boiling point acids such as sulfuric acid can be added to the slurry, preferably in the range of 0.0001% to 1% in order to accelerate the rate of, and to increase the degree of extraction of extractables.

Optionally, within the shear and cavitation treated biomass slurry, an alkaline chemical such as lime, sodium hydroxide or any other suitable base chemical, is added at ratios between 0.0001% to 10% by weight to net biomass in slurry, in order to accelerate and enhance extraction of tannins, fats, oils and other trace biomass components, protein, and protein derivatives such as polypeptides and/or ammo acids (extractables), and sugars including glucose, arabinose, galactose, mannose, disaccharides and trisaccharides of the same sugars, in biomass where such components exist, and have not been removed with another process or process step prior to the present invention.

In either application of alkaline or acid as described immediately above, controlled conditions in the ranges described herein, of catalyst concentration, temperature, time and the application of high shear and/or cavitation can produce a controlled, limited, hydrolysis resulting in cell compromise to enhance mechanical extraction of liquid.

Cell perforation is enhanced with the addition of acid or base chemicals combined with high shear and/or cavitation, which lowers process viscosity and increases process capacity for higher solid loadings as liquid normally trapped inside biomass cells are released. Removing water from perforation cells with mechanical pressure correspondingly lowers drying costs of products. A chemical optionally applied in the first slurry produces varying degrees of hemicellulose hydrolysis, determined by combinations of residence time, temperature, and chemical loading. When a separate protein and tannin product extraction is formulated for marketing, the slurry containing no additional chemicals, or minimal chemicals as low as 0.0001% to the slurry, at various temperatures up to the boiling point of water, at one atmosphere or at higher temperatures under pressure, is applied to accelerate and enhance their extraction with minimal hemicellulose components extracted. One preferred temperature for protein extraction is up to 120 degrees Celsius.

This step is performed long enough to perforate at least a portion of the cells of the biomass, such as at least 30%, and preferably 70% or more preferably 90% of the cells. The greater percentage of cells perforated at this stage, the more water can be extracted from the biomass at this stage.

Mechanical Separation of First Slurry and Solids

The first slurry processed by shear and/or cavitation and chemicals is then mechanically pressed (2, 4) to separate liquid from biomass, to typically 50%-65% liquid relative to biomass, but can be between 0% and 99.99% depending on the type of mechanical press device, pressure setting, temperature, type and degree of chemical added if any, degree of biomass cell disruption and release of liquid from cells when mechanically pressed, and other factors.

Liquid pressed by a mechanical device is recycled (4) to supply liquid required to conduct slurry processing at low, medium, high shear, and cavitation (1a, 1b), and to concentrate extractables. Mechanical separation devices that can be used (2, 4, 11, 18) include but are not limited to centrifuge, a screw press, a belt press, a plate and frame press, a roller drum filter with pressure belt or any solid-liquid mechanical separation device known to those skilled in the art.

First Liquid Extraction

The first liquid extraction produced from mechanical separation of the first slurry option without adding chemicals, is mixed with more new biomass in repeated cycles (3,4), which, as extraction of extractables proceeds, regenerates the first slurry with increasing concentrations of tannins, protein, polypeptides and amino acids. For more efficient extraction of extractables, chemical catalysts are added to the slurry, producing, in addition to the extractables described above, various levels of hydrolyzed hemicellulose derivative sugars which can be also extracted.

A preferred first slurry concentration and viscosity is one in which a high percentage of extractables are released and separated from solids, while the slurry can still be pumped with a centrifugal pump, or if a high level of hydrolysis can be achieved at even higher viscosity, a screw type, progressive cavity pump with product concentration reaching 7%-60% before boiling for separation and concentration.

When a preferred concentration of extractables is reached, in excess of 7%, a side stream of first liquid extraction is diverted from the recycle stream after mechanical pressing (4, 6).

Heat from any source is applied to the diverted first liquid extraction (7). The heat can be provided from internally cycled sources, or system-produced steam from burning extracted lignin or from burning any source of fuel. Heat can be in the form of steam and/or indirect heat through double-wall pipes or tanks. Dissolved extractables are recovered as a dry product (8), or optionally for further processing, at various levels of residual water. Optionally, vacuum can be applied in order to lower drying temperature in order to protect hydrolyzed or otherwise extracted biomass components, such as protein and/or protein derivatives. Boiling temperature required correlates to the specific combination of water, and acid or base, and their respective boiling points. Alternatively, the heat exchanging dryer method described below may be employed here.

Drying Mechanically Separated Biomass Solids

The mechanically separated biomass solids in the press cake are dried in any type of suitable drying system known to those skilled in the art, including direct or indirect heating systems using internally extracted lignin, external solid or liquid energy sources, or solar energy (5).

The drying process is controlled to produce dry biomass or optionally biomass which contains water to achieve specific catalyst/water content relative to acid or base chemical catalysts in downstream stages of the present invention (9).

Hydrolysis water can be provided through partially dried biomass, or additional water can be injected into the first hydrolysis stage from a separate source, with biomass entering in substantially dried form, or partially wetted form.

Continuous Hemicellulose Hydrolysis Process

Preferably, the process uses a continuous hemicellulose hydrolysis process.

This step in the process requires combining an acid catalyst (which may be recycled from step (14)) with dry residual biomass solids (from step (5)) in a second slurry for hemicellulose hydrolysis.

In one embodiment of this step, a strong acid in concentrations above 0.0001% by mass is combined with dry residual biomass solids in a continuous hemicellulose hydrolysis process.

In another embodiment of the process, a catalytic liquid containing acetic acid at a concentration above 0.001% is employed, combined with a strong acid in concentrations above 0.0001%, provided that the minimum water level is still maintained at that required for hemicellulose hydrolysis to occur in producing sugar concentrations above 7%.

However, the process also involves continually adding dried or high solids biomass [8] while maintaining a high sugar product slurry concentration of at least 7% and up to 80% by mass.

This continuous process further involves continually mechanically separating and recycling extractives from the product slurries, and applying those recycled extractives and catalysts to hemicellulose hydrolysis or fresh incoming biomass going into hemicellulose hydrolysis. The process also involves continually producing a secondary slurry in which solids are mechanically separated slurry comprising a product slurry which may be dried to separate out hemicellulose hydrolyzates. When acetic acid is applied, acetic acid is added to the recycled slurry as it is extracted through hydrolysis of fresh biomass. As required, the catalysts may be replenished from secondary sources to maintain specified ratios of acetic acid and other acids As hydrolysis progresses, additional biomass (12) and any additional necessary water for hydrolysis from new biomass or from any water source, is injected into the batch or continuous hydrolysis tank, pipe or other hydrolysis vessel until a combination of the following is achieved:

All or substantially all hemicellulose is hydrolyzed at maximum viscosity which centrifugal pumps, high shear and cavitation devices can pump the solids-containing slurry being treated; or Hydrolysates have reached maximum possible concentrations and viscosity for pumping.

Viscosity is maintained for optimized pumping and/or high shear treatment (Mixing at higher viscosity is achieved using suitable mixing solutions known to those skilled in the art, including screw type devices [11-2]).

Hemicellulose Hydrolysis Batch Process

This step in the process requires combining an acid catalyst (which may be recycled from step (14)) with dry residual biomass solids (from step (5)) in a second slurry for hemicellulose hydrolysis. In one embodiment of this step, dilute strong acid, or dilute strong acid and concentrated acetic acid, are combined with dry residual biomass solids in a batch hemicellulose hydrolysis process employing one or more trains of slurry.

In an embodiment of the process, a catalytic liquid containing acetic acid at a concentration above 0.001% is employed, combined with a strong acid in concentrations above 0.0001% provided that the minimum water level is still maintained at that required for hemicellulose hydrolysis to occur in producing sugar concentrations above 7%.

Residence times for the hydrolysis are between 0.001 seconds and 30 days, while providing quantitative or nearly quantitative hydrolysis.

The catalytic acid liquid temperature with each catalyst formula is established up to, but not at the boiling point of the catalytic liquid. Higher temperatures up to 220 degrees Celsius can be used by providing high pressure vessels with pressure corresponding to specific catalyst solution requirements to prevent boiling.

Multiple trains of the same batch process may operate in sequence to supply steady creation of hemicellulose hydrolysates of sugar, protein, minerals, some lignin and other hydrolysates, and to reduce residence time for circulating sugars to insure quality of sugars.

Mechanical Separation of Residual Cellulose-Lignin

After hemicellulose hydrolysis is complete, the second liquid extraction containing hemicellulose sugars and other extractables is separated from the solids portion containing cellulose-lignin solids (11). Mechanical separation devices that may be employed include a centrifuge, a screw press, a belt press, a plate and frame press, a roller drum filter with pressure belt or any solid-liquid mechanical separation device known to those skilled in the art.

Mechanically separated cellulose-lignin biomass may be completely dried (13) applying heat, with recycled, condensed catalyst liquid being applied to incoming biomass or into the hemicellulose hydrolysis vessels (14). Optionally, the catalyst liquid may be condensed using the heat exchanging dryer method described below.

Upon separation, the following occurs with the liquid second extraction containing hydrolyzed hemicellulose sugars and other extractables:
1. Liquid second extraction and acid catalysts are recycled into hemicellulose hydrolysis (12)
2. A build-up of extractables occurs from repeating the addition of new biomass, hydrolysis of hemicellulose, mechanical separation and recycling of catalyst and liquid product until product concentration is above 7%
3. When appropriate, a stream of liquid second extraction containing hemicellulose extractables is diverted and heat is applied to boil off the acid catalyst and produce dry hemicellulose extractables (15). The heat exchanging dryer method described below may be employed here.
4. Acid catalyst condensed from boiling of liquid second extraction are applied to
   a. Hemicellulose hydrolysis directly (9), or
   b. Incoming biomass (1a, 1b).

Lignin Extraction

If lignin has not been extracted prior to, or with hemicellulose, the cellulose contains lignin in various ratios depending on biomass type and original lignin content.

Dried cellulose-lignin microfibres from the hemicellulose drying system (13) may be removed from the dryer and introduced into a lignin hydrolysis pipe or tank. The lignin may then be mixed with recycled hydrolyzed lignin alkaline chemical slurry (17, 20), optionally treated with high shear and/or cavitation. The resulting slurry may then be treated either at one atmosphere from one degree Celsius above freezing up to but not at the boiling point of the alkaline-water hydrolysis solution, or treated at higher pressures and temperatures up to but not at hydrolysis temperatures of the cellulose fraction of the lignin-cellulose microfibres, which is preferably approximately under 170 degrees Celsius.

When all or substantially all lignin is liquefied in start-up, mechanical separation is applied to the slurry to separate the liquefied lignin and alkaline catalyst solution from residual cellulose (18). New cellulose-lignin and make-up alkaline catalyst may be added to build up product concentration in start-up to achieve maximum product concentration (20) while mechanical separation is applied repeatedly until maximum liquefied lignin slurry viscosity is reached in maintaining viable pumping, thereby liquefying a high percentage of lignin. Pumping of lignin slurry can be provided by centrifugal or screw pumps, high shear and/or cavitation devices. If the process is operating in a batch configuration, as outlined above, when the optimal concentration of lignin product is reached, the entire liquefied lignin slurry is processed to recover lignin by boiling off water (22). Optionally, the pH of slurry can be neutralized before any mechanical separation occurs in order to precipitate lignin.

If the process is operating in a continuous lignin liquefying process, a secondary stream of liquefied lignin is pH adjusted with acid to precipitate the lignin. Optionally a sparging device producing bubbles is applied to lift and concentrate the lignin, lignin is mechanically separated then boiled to separate and to dry water from lignin to produce a dry lignin (22). In this case, the primary liquefied lignin stream and catalyst continues to be recycled as fresh cellulose-lignin and make up alkaline chemical is applied (20) until the liquefied lignin product reaches an optimal viscosity and product concentration, beyond which viscosity is too high for pumping. Optionally, a wash cycle or cycles using water can be applied to remove more lignin from residual cellulose solids.

Mechanically separated cellulose may be dried (19) to a percentage of sufficient moisture for hydrolysis in concentrated, strong acid hydrolysis (23a), or may be mixed with water to form a slurry for low concentration, strong acid hydrolysis (23b).

Cellulose Hydrolysis

In the process, the cellulose may be hydrolysed into glucose as follows. A cellulose slurry for the hydrolysis of cellulose into glucose may be formed by combining dry or mostly dried cellulose (from (19)) with either:
  Concentrated strong acid, in which case the slurry is kept at one atmosphere pressure and at least one degree above freezing; or
  Water and dilute strong acid, in which case the slurry is kept at a temperature sufficient to hydrolyze the cellulose to glucose (i.e. 170-250 degrees Celsius).
  Water and dilute strong acid and a concentrated mild acid, keeping the slurry at a temperature sufficient to hydrolyze the cellulose to glucose (170-250 degrees Celsius);
  Hydrolysis will occur over a period of time, preferable over a period of 0.0001 seconds to 30 days.

In one embodiment of the process, a strong, preferably low boiling point acid, in concentrations from 0.001% to 10%, preferably less than 1%, and water, is applied to the cellulose extracted from the lignin extraction step described above (23a).

In another embodiment, a strong, preferably low boiling point acid in concentrations from 0.001% up to 10% is applied to the cellulose under pressure at temperatures between 170 degrees Celsius and 220 degrees Celsius for 0.0001 second up to 30 days in completing hydrolysis of all, or substantially all cellulose, above 50% hydrolysis of all cellulose.

In either acid combination described above, hydrolysis is augmented by the optional application of shear high shear or cavitation, while additional cellulose is added to the slurry to increase the concentration of sugars.

Upon completion of cellulose hydrolysis, the slurry is either:
- pH neutralized for use in downstream processes; or
- boiled employing the drying process below with sugars separated from the catalyst, where the catalyst is recycled and recondensed using the drying process described below.

Cellulose Hydrolysis Using Concentrated Strong Acid

Figure 3:
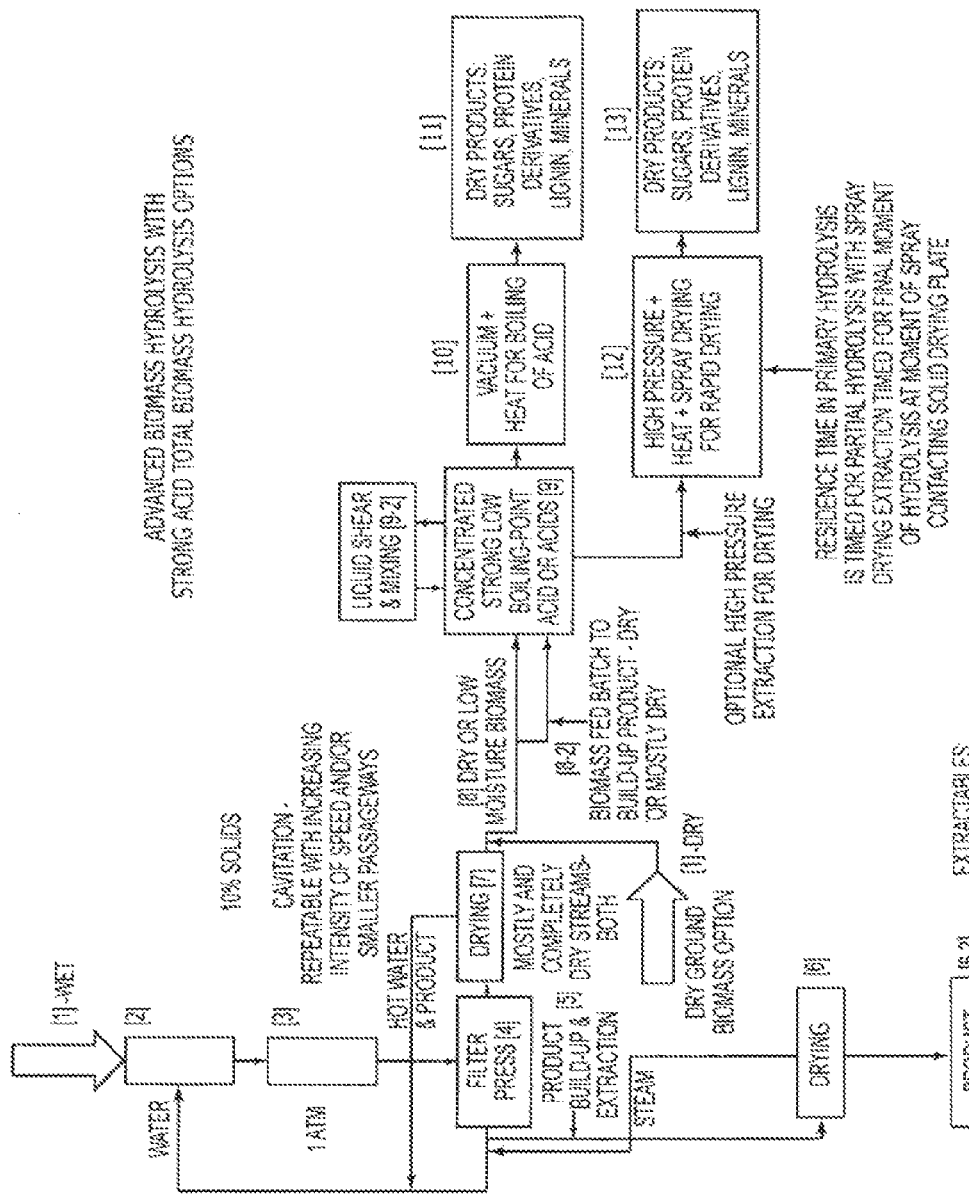
FIG. 3 depicts options for one stage strong acid hydrolysis.
Figure 4:
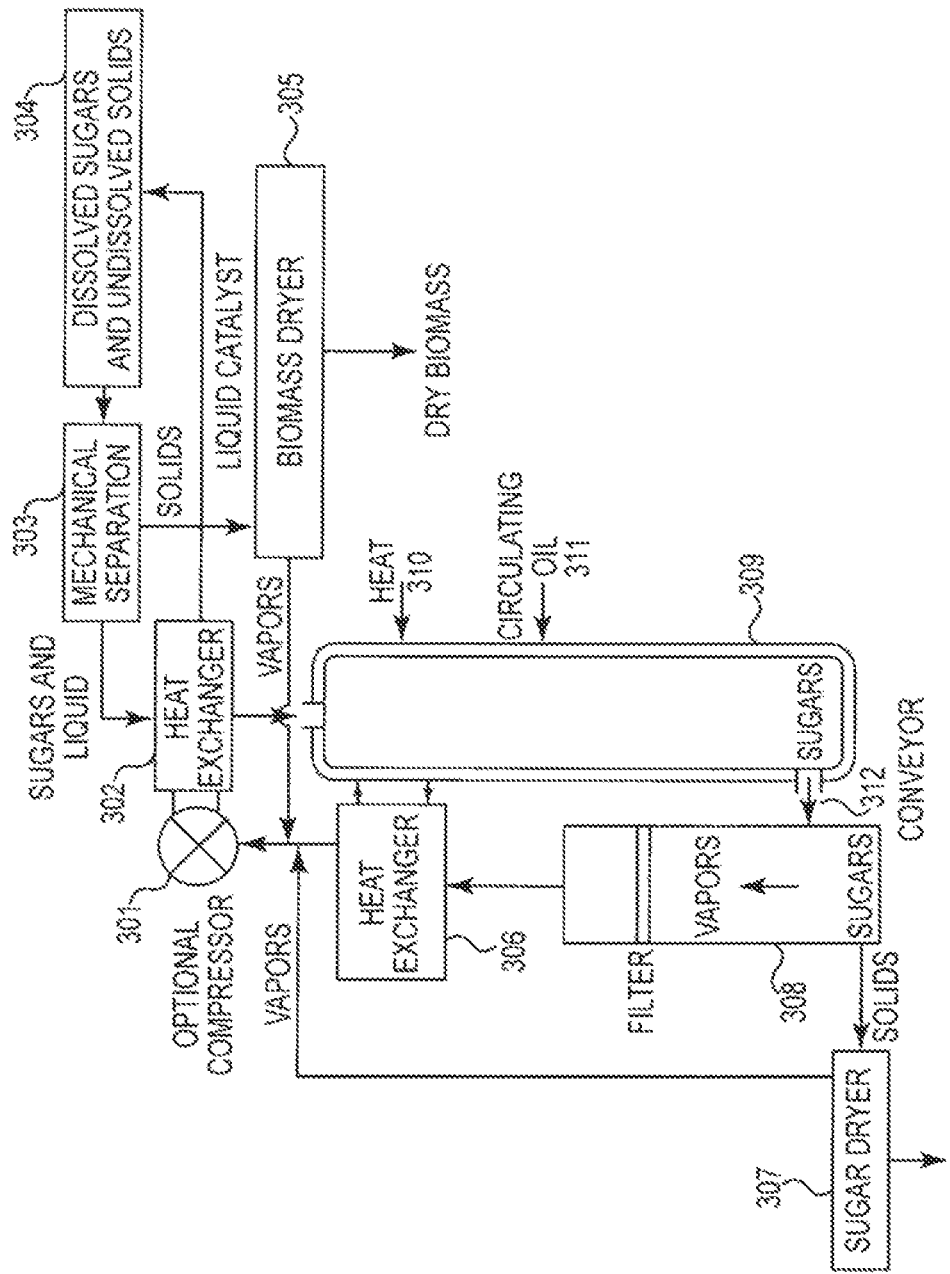
FIG. 4 depicts a heat exchanging dryer method.

Unless otherwise noted, all number references within this section are to FIG. 3. In one embodiment, the method of reducing particles and pre-treating biomass in FIG. 1, [2]-[7], is applied. In this variant, small-dimension dry or high solids biomass fibres are introduced into low boiling point strong acid and water at a low temperature, between 1 degree Celsius and 118 degrees Celsius. The solution is maintained at water ratios relative to the concentration of the strong acid catalyst and to the net biomass in the proportions required to minimize the water required to facilitate hydrolysis [9]. Mixing, or high-shear and/or cavitation are optionally applied at various time points during this process as the biomass fibers hydrolyze FIG. 3 [9-2]. Additional dry or mostly dry fine biomass fibers, depending on water requirements for hydrolysis, are introduced continuously during the hydrolysis. The resulting solution is maintained at viscosity sufficient for optimal hydrolysis rates and optimal yields, ideally above 80% concentration by mass. The viscosity should allow for mixing, FIG. 3 [8-2] and flow without pumping failure.

The high viscosity biomass hydrolysates slurry, which may consist of acid, water, sugar, lignin, amino acids and minerals, is dried by applying heat or, alternately, extracted and pumped to a high pressure zone. It may also be dried by being pressurized, then released into a lower pressure zone while applying heat. It may be spray dried against a solid surface, or dried by applying pressure and optionally heat sufficiency high to provide for fast drying and degree of drying upon pressure release. Optionally, vacuum is also applied to reduce boiling temperature of the acid catalyst. The drying method described herein may be employed to produce dry products.

Hydrolysate solids are mechanically scraped and moved into a solids-concentrating screw or other device which removes dry or partially dried hydrolysates from the blow down zone and its heat. Hydrolysates, comprising sugar, lignin, amino acids and minerals, if not completely dried off of the volatile acid solution, are dried in a one atmosphere dryer, or are introduced into a vacuum to lower boiling temperature of the acid catalyst, with the acid catalyst being rapidly boiled to produce a dry product. Acid vapors are condensed utilizing heat exchanger, including the drying design described herein. Alternately, volatile acid vapors are condensed onto new, unhydrolyzed biomass.

Spray Drying Method in Both Hemicellulose, Lignin and Glucose Product Recovery

In one drying and separation embodiment, the slurry extraction for boiling is pumped into a high pressure zone, where optionally a cavitation device with, or without the recompression side of the device, or a high pressure spray nozzle, can be employed as a release method for slurry boiling. The slurry is then blown down to a lower pressure while optionally adding heat directly or indirectly. The slurry may be optionally spray dried using spray drying systems known to those skilled in the art to facilitate drying. The resulting dry or substantially dry solids are rapidly scraped and removed into a separate zone for further low pressure drying [14], or for dry product recovery [14-2]. In one embodiment, a vacuum is applied to the extracted slurry in order to lower the boiling point of the liquid fraction in order to protect hydrolysis products.

Heat Exchange Drying and Recycling Method

With reference to FIG. 3, in one embodiment, a sugar solution near or just below the boiling point of the solution is extracted from hydrolysis system (304), consisting of sugar, catalyst and undissolved biomass solids. Mechanical pressure is applied through a belt press, plate and frame press, screw press, centrifuge or any type of solid liquid separation method known to those skilled in the art (303). Solids with residual liquid are dried in biomass dryer (305). Additional filtration can be optionally applied to the liquid fraction expressed from the above described separation method to further clarify the liquid stream of solids.

The sugar solution passes through a heat exchanger through which additional heat is applied (302). Typically, heat is transferred from a recycled vapor from within the drying stage, optionally including a compressor prior to the heat exchanger to increase the pressure and temperature of vapors (301). Instantly, the sugar solution enters an expansion chamber, typically a double walled vessel (309) with circulating oil or other fluid suitable for transporting heat at a temperature above the boiling point of the sugar solution. Optionally, a spinning shaft with blades rotates within the expansion chamber with blades operating close to the chamber walls to disperse and aid in removal of liquid from sugars as they fall to the bottom of the chamber. Sugars and vapors are conveyed out of the expansion chamber into a solids-vapor separation zone (308) with vapors rising towards a heat exchanger (306), while sugars are further conveyed into a final sugar dryer (307). Vapors going through the heat exchanger (306) exchange heat into the expansion chamber's double wall to maintain a temperature above the boiling point of the incoming sugar solution, with the balance of vapors continuing to an optional compressor (301) and/or the heat exchanger through which the incoming sugar solution is pumped.

Alternately, when applying concentrated strong, low boiling point acid, the boiling and drying method described above is employed to utilize heat exchanger to conserve energy by exchanging boiling energy requirements with condensing energy requirements to separate product from catalyst for re-use within the process.

Glucose Storage

Glucose, xylose, arabinose, galactose and other trace sugars, protein, amino acids, lignin, tannins, minerals and other trace biomass-derived extractives produced by the present invention method can be stored in custom storage systems to prevent molding, insect, and animal problems. Systems are designed to receive large plastic bags containing glucose, with bags fitting tightly within the storage structure to minimize space around bags. Options for humidity, pest, and organic contamination control include small air conditioning systems, or vacuum to make insect life impossible, gases, or other means of quality control for extended timeframes.

Biomass Feed

The term "biomass" includes any wet or dry organic matter (whole, fractions thereof, and/or any components thereof) available on a renewable basis, such as dedicated energy crops and trees, agricultural food and feed crops, agricultural crop wastes and residues, wood wastes and residues, aquatic plants, animal wastes, municipal solid wastes, raw sewage or post processing sewage solids, and other waste materials. Such biomass materials can serve as raw materials for the process of the present invention. Additional examples of relevant sources of biomass include, but are not limited to, cellulose-containing materials such as corn-fibre, hay, sugar cane bagasse; starch-containing cellulosic material such as grain, crop residues, newsprint, paper, sewage sludge, aquatic plants, sawdust, yard wastes; components thereof, fractions thereof, and any other raw materials or biomass materials known to those of skill in the art. Lignocellulose-containing fibre can potentially be refined into sugars, protein, lignin and chemicals.

In general, the term "biomass" as used herein can include any carbon-based materials. Biomass can therefore include, without limitation, trees, grass, straw, grain husks, stalks, stems, leaves, aquatic plants such as water hyacinths, duckweed, paper, wood, etc. Preferably, the material of greatest use is a grass. Examples of grasses include, but are not limited to, *Axonopus affinis* and *Axonopus compressus*, centipede grass (*Eremochloa ophiuroides*), buffalo grass (*Buchloe dactyloides*), hurricane grass also called Seymour grass (*Bothriochloa pertusa*), and seashore paspalum (*Paspalum vaginatum*). Other grasses that can be used include Poa, *P. schistacea, P. xenica, Deyeuxia lacustris, Dichelachne lautumia, Brachiaria Mutica*, acorus, andropogon, carex, festuca, glyceria, molina, panicum, phalaris, spartina, sporobolus and miscanthus.

Other types of biomass employable in the process include: any type of biomass derived from processing, such as oat or rice hulls, canning food waste or other refining or processing waste; straw, corn stover or native biomass of any type that is collected loose, baled, ensiled, piled or in any other configuration commonly employed in agriculture or harvest; raw sewage solids or post-processing sewage sludge, dry or wet, collected at any concentration from a sewage plant; filtration of raw, unsettled sewage can be applied in some embodiments of the invention to concentrate solids; aquatic plants such as algae and water hyacinths or any type of aquatic plants.

Types of Slurry Equipment used in the Present Invention

There are a number of machines that can be used to mechanically reduce the particle size of biomass.

One optional means for processing large biomass particles into smaller particles in a slurry are "conical tools" (e.g. Suprato™ Conical Tool). In the Supraton™ device, the rotor is bolted onto a shaft and the stator is bolted into the end plate, but different models or brands can employ different types of internal system configurations. Generally, conical tools are a set of rotor-stators of two cone-shaped internal wetted components with matching indented faces. Adjustable, small distance passages exist between the two faces, with one rotor which moves, and one stationary stator component. Together, the components create shear as a biomass slurry enters the system and is then forced centrifugally between the two faces due to any upstream external and the Supraton's pumping centrifugal force. Larger biomass particles are shredded and torn, resulting in smaller particles.

Many other types and brands of slurry shear and cavitation process machines are known to those skilled in the art, including IKA, IKA HED, Silverson, Greerco, Arisdyne, Cavitation Technologies, Inc., and others. Alternately or in combination with the conical tools design, an HED type of "slurry-grinder" pump with a single rotor and and a single stator screen, the stator screen with custom screen hole sizes as large as 50 millimeters in diameter, to as small as 0.25 millimeters, is applied to further reduce biomass particle size without cavitational forces. Such a grinder pump produces little if any cavitation, but does produce shear forces in which water flow of a slurry is violently split to reduce particle size, and can be made more intense due to smaller hole sizes in the stator.

Any shear or cavitation device can be applied multiple times to achieve specific results in mechanical particle size reduction, or in combination with chemical catalysts and heat to achieve different rates and degrees of hydrolysis, including quantitative hydrolysis, and to achieve cell disruption to enhance mechanical liquid extraction. Examples of cavitation devices useful in the present invention are those manufactured by BWS, Cavitation Technologies, Inc., Arisdyne or any other manufacturer's machine which can be employed to create cavitation. Some cavitation devices can utilize holes as small as 0.25 millimeters to create different levels of cavitation shear. In cavitation devices with intermeshing rotor-stator design, feet per second rates of rotor rotation can range from 50 feet per second to 400 feet per second. Cavitation is created by inducing pressure through pumping action of a rotor at the entry side of holes in rotor-stator design, with a lower pressure on the exit side of the hole, or a single hole in a pump and nozzle design. Single nozzle tools are a variation of rotor stator machines in that pressure above the nozzle entrance is created in a separate position within the machine from the single nozzle. Any type of cavitation device can optionally be used in the present invention depending on specific process requirements and advantages of a particular machine. Combinations of cavitation machine types can be optionally be employed, including for example in drying strategies.

The invention claimed is:

1. A process for refining biomass, the process comprising the steps of:
   a. performing a first hemicellulose hydrolysis by:
      (i) forming a first slurry from the biomass having a first solids portion comprising hemicellulose and cellulose, and having a first liquid portion;
      (ii) adding an alkaline catalyst and applying heat and either mechanical shear or cavitation to the first slurry;
      (iii) mechanically separating the first solids portion from the first liquid portion;
      (iv) combining the first liquid portion with additional biomass and repeating steps (a)(ii) and (a)(iii) until at least a 7% concentration of extractable products in the first slurry is achieved; and
      (v) recovering the extractable products from the first slurry; and
   b. performing a second hemicellulose hydrolysis by:
      (i) combining the first solids portion and an acid catalyst in a second slurry having a second solids portion, and a second liquids portion comprising hemicellulose hydrolyzates in solution, and applying mechanical shear or cavitation to the second slurry resulting in hydrolysis of the hemicellulose and producing additional acid catalyst;
      (ii) mechanically separating the second solids portion from the second liquid portion;
      (iii) recovering the acid catalyst from the second liquid portion; and
      (iv) repeating steps (b)(i) and (b)(ii), using, in step (b)(i), the second solids portion recovered in step (b)(ii) as the first solids portion and the catalyst recovered in step (b)(iii), adding additional catalyst to maintain a minimum specified concentration of acid catalyst and maintain a sugar product concentration of at least 7%, until all or substantially all hemicellulose is hydrolyzed.

2. The process of claim 1, wherein the second solids portion comprises lignin, further comprising the steps of
   c. drying the second solids portion comprising cellulose-lignin microfibres;
   d. hydrolyzing the lignin in the second solids portion in an alkaline catalyst solution by applying mechanical shear or cavitation; and e. mechanically separating the liquid portion of the hydrolyzed lignin from the second solids portion.

3. The process of claim 2, wherein step of hydrolyzing lignin is repeated to concentrate the lignin in solution before step of mechanical separation and all or substantially all lignin is liquefied.

4. The process of claim 1, wherein any one of steps a., b., and c., and any combination thereof, takes place at atmospheric pressure.

5. The process of claim 1, wherein weak acid concentration in solution is in the range from 0.001% to 90% by volume, and at least one other strong acid concentration in solution is in the range from 0.001% to 3% by volume.

6. The process of claim 1, wherein step b. or c., takes place above 0° C. and below 118° C.

7. The process of claim 1, wherein a weak acid is added in solution to a concentration of between 60% and 80% by volume.

8. The process of claim 5, wherein the at least one other strong acid is present in a concentration between 0.001% and 1% by volume.

9. The process of claim 2, further comprising the step of:
f. hydrolyzing cellulose in the second solids portion in the presence of at least one strong acid to produce solution comprising sugar.

10. The process of claim 9, wherein step b. iv) is repeated to raise the concentration of the sugar in the solution comprising sugar to greater than 15% by mass.

11. The process of claim 10, further comprising drying the solution comprising sugar.

12. The process of claim 9, wherein the sugar comprises glucose.

13. The process of claim 2, further comprising drying the second solids portion to remove moisture and the weak acid to produce dry cellulose.

14. The process of claim 1, wherein acetic acid is produced as a product of hydrolysis, and is recovered and used as the catalyst.

15. The process of claim 2, wherein the alkaline catalyst introduced in step d is reclaimed and used to hydrolyze hemicellulose in step a (ii) of claim 1.

\* \* \* \* \*